(12) United States Patent
Saeki

(10) Patent No.: US 7,028,013 B2
(45) Date of Patent: Apr. 11, 2006

(54) PERSONAL AUTHENTICATION SYSTEM, AND PERSONAL AUTHENTICATION METHOD AND PROGRAM USED THEREFOR

(75) Inventor: Tomoya Saeki, Kashiwazaki (JP)

(73) Assignee: NEC Corporation, Tokyo (JP)

( * ) Notice: Subject to any disclaimer, the term of this patent is extended or adjusted under 35 U.S.C. 154(b) by 661 days.

(21) Appl. No.: 09/838,319

(22) Filed: Apr. 20, 2001

(65) Prior Publication Data

US 2001/0037310 A1    Nov. 1, 2001

(30) Foreign Application Priority Data

Apr. 26, 2000   (JP)   ............... 2000-125062

(51) Int. Cl.
*G06F 17/60*   (2006.01)
(52) U.S. Cl. ................. 705/64; 705/67; 705/75; 705/78; 705/79; 713/182; 713/200; 713/201
(58) Field of Classification Search ............ 705/64–79, 705/200–202, 2, 3; 713/200–202, 155, 182–186
See application file for complete search history.

(56) References Cited

U.S. PATENT DOCUMENTS

| | | | | |
|---|---|---|---|---|
| 6,404,337 | B1 * | 6/2002 | Van Till et al. ............. | 340/569 |
| 2001/0018660 | A1 * | 8/2001 | Sehr ................................. | 705/5 |
| 2001/0039535 | A1 * | 11/2001 | Tsiounis et al. ............... | 705/71 |
| 2002/0120496 | A1 * | 8/2002 | Scroggie et al. ............... | 705/14 |
| 2003/0204610 | A1 * | 10/2003 | Howard et al. ............. | 709/229 |
| 2003/0212642 | A1 * | 11/2003 | Weller et al. ................. | 705/67 |
| 2004/0243431 | A1 * | 12/2004 | Katz ............................... | 705/1 |

FOREIGN PATENT DOCUMENTS

| | | |
|---|---|---|
| JP | H9-319927 A | 12/1997 |
| JP | H10-312437 A | 11/1998 |
| JP | H11-73467 A | 3/1999 |
| JP | H11-167553 A | 6/1999 |
| JP | H11-339106 A | 12/1999 |
| JP | 2000-40156 A | 2/2000 |
| WO | WO 98/50875 A2 | 11/1998 |

OTHER PUBLICATIONS

U.S. Appl. No. 60/181,224.*
U.S. Appl. No. 60/181,225.*
Dokodemo Bank, Nikkei Pasokon, Japan, Nikkei BP Publishing Co., Ltd., May 3, 1999 vol. 336 pp. 180-181.
"INTERNET magazine," Japan, Impress Co., Ltd., Jan. 1, 2000, No. 60, B039-B069.

* cited by examiner

*Primary Examiner*—James P. Tramwell
*Assistant Examiner*—Jalatee Worjloh
(74) *Attorney, Agent, or Firm*—Sughrue Mion, PLLC

(57) ABSTRACT

To provide a personal authentication system that enables a client to receive services even if he fails to carry his card or the like with him or loses it, thus preventing the abuse of the card or the like by a third person and the leakage of the personal information. When data identifying a client are transferred to an authentication server using an authentication terminal, the authentication server collates the sent data against personal authentication data registered previously in a database to identify the client and sends the results of the identification to the authentication terminal. After the authentication, when the authentication terminal requests the payment of charges from a settling account registered previously in the database, the read and modification of personal data, or the like, the authentication server executes a process based on the sent request.

7 Claims, 15 Drawing Sheets

PERSONAL AUTHENTICATION SYSTEM, AND PERSONAL AUTHENTICATION METHOD AND PROGRAM USED THEREFOR

BACKGROUND OF THE INVENTION

1. Field of the Invention

The present invention relates to a personal authentication system, a personal authentication method used for various services, and a personal authentication program, and in particular, to a personal authentication method for various services such as credit and medical services.

2. Description of the Related Art

With conventional credit services, if a person is to utilize a credit company to purchase a commodity or receive a service, he presents a credit card issued by the credit company beforehand and signs a document describing a consideration for the commodity or service so that the consideration can be settled later using a personal settling account registered with the credit company.

Further, if a person is to purchase a commodity or receive a service online via the Internet or the like, personal authentication is executed using a credit number issued by the credit company, an issued year and month, and a password composed of a simple combination of digits so that the consideration is settled using a personal settling account registered with the credit company.

Furthermore, if a person is to utilize a credit company to pay the price of the utilization of a general public line service (a public telephone) for a telephone call, data communication, or the like, personal authentication is also executed using a credit number issued by the credit company, an issued year and month, and a password composed of a simple combination of digits so that the consideration is settled using a personal settling account registered with the credit company. In this case, the consideration can also be settled using a prepaid card issued by the telephone company.

Moreover, when a person visits a hospital, he presents his consultation card issued by the hospital, at a hospital clerk's window to receive his medical sheet, examination data, or the like and after diagnosis or treatment, returns the medical sheet and pays medical expenses at the hospital clerk's window.

On the other hand, when a person applies to a government office for a passport, a driver's license, or various other licenses, he executes a clerical procedure by obtaining a document such as a copy of a certificate of residence, a copy of the portion of his family register which relates to him, or a copy of his family register and presenting at an application officer's window an ID card that identifies him.

Further, when a person is to borrow a book from a library, he presents his ID card beforehand to have a librarian prepare and issue a loan card which must be presented whenever he borrows or returns a book.

Moreover, if a person is to use a facility in a private sports gym or the like or receive a service therefrom, he executes a registration procedure beforehand and generally presents an issued membership card to use the facility or receive the service. The person presents his membership card each time he utilizes the sports gym.

Entries to and exits from facilities such as private or corporate premises or buildings for which entries and exits are limited are managed by having visitors present their entry permits, ID cards, or the like or executing collations against previously registered passwords.

With the above described conventional personal authentication systems, when a person is to purchase a commodity or receive a service and is to utilize a service from a credit company by presenting a credit card to the company but if he fails to have the credit card with him or loses it, he cannot receive the service or the credit card may be abused by a third person. Further, if the credit card is forged, such services may be illegally utilized.

Further, if a person is to purchase a commodity or receive a service online via the Internet or the like, he must present information including a credit card number, an issued year and month, and a password. If the person forgets these information, even this person cannot purchase the commodity or receive the service. In this case, since these information is easily available, it may be abused by a third person.

Furthermore, not only cash but also a prepaid card or a service from a credit company can be used as a means for paying the price of the utilization of a general public line service, but this means also requires a card or information such as that described above. If the person fails to have cash or his card with him or forgets the information required for the credit service, even this person, who is a regular user of this service, cannot utilize it and the card may also be forged and illegally utilized.

Moreover, when a person visits a hospital, he presents his consultation card issued by the hospital so as to be identified. Consequently, personal information such as a medical history may leak due to the abuse of a lost or forged consultation card. In this case, if a person is to utilize a service from a credit company to pay medical expenses, he must have his credit card with him in addition to his consultation card. If he fails to have it with him or loses it, he cannot receive the service.

When a person applies to a government office for various licenses, he must prepare in advance a document such as a copy of a certificate of residence, a copy of the portion of his family register which relates to him, or a copy of his family register and presenting at an application officer's window an ID card that identifies him. Accordingly, the clerical procedure is cumbersome.

Further, when a person borrows a book from a library, he must present a previously issued loan card. If he fails to have the card with him, he cannot borrow the book; if he loses the card, he must have a new loan card issued. Thus, it is cumbersome to manage the loan card.

Moreover, if a person utilizes a private facility or receives a service therefrom, he must present a previously issued membership card. If he fails to have the membership card with him, he cannot utilize the facility. Additionally, if he loses the card, it may be abused.

Furthermore, to enter or leave facilities such as private or corporate premises or buildings for which entries and exits are limited, a person must present a previously issued entry permit, his ID card, or the like or have his password collated against a previously registered one. If he fails to have the permit or ID card with him or forgets the password, he is not allowed to enter or leave the facility. If he loses the permit or ID card or the password leaks, a third person may illegally enter or leave the facility.

SUMMARY OF THE INVENTION

It is thus an object of the present invention to provide a personal authentication system, a personal authentication method used for various services and a personal authentication program which enables a person to receive a service without carrying a card or the like with him, thereby preventing a third person from abusing the card or the like, for example, misappropriating or forging it and also preventing the leakage of personal information.

The present invention provides a personal authentication system for connecting, via a communication line, an authentication server for authenticating a client to identify the client to an authentication terminal for inputting authentication information required for the personal authentication, wherein:

the system has a database for storing at least personal authentication data required for the personal authentication, settling account information required to process charges, and data required to receive various services, and the authentication server has a function of collating the authentication information input from the authentication terminal via the communication line, against the personal authentication data stored in the database, a function of processing charges based on the settling account information registered in the database based on a request from the authentication terminal when the client is authenticated during the identification, and a function of providing, registering, and managing personal data registered beforehand in the database based on a request from the authentication terminal when the client is authenticated during the identification and periodically communicating a collation history, a personal data usage history, and a charge process history.

The present invention provides a personal authentication method for a personal authentication system for connecting, via a communication line, an authentication server for authenticating a client to identify the client to an authentication terminal for inputting authentication information required for the personal authentication, wherein:

the system has a database for storing at least personal authentication data required for the personal authentication, settling account information required to process charges, and data required to receive various services, and the authentication server has a step of collating the authentication information input from the authentication terminal via the communication line, against the personal authentication data stored in the database, a step of processing charges based on the settling account information registered in the data base based on a request from the authentication terminal when the client is authenticated during the identification, and a step of providing, registering, and managing personal data registered beforehand in the database based on a request from the authentication terminal when the client is authenticated during the identification and periodically communicating a collation history, a personal data usage history, and a charge process history.

The present invention provides a personal authentication program for a personal authentication system for connecting, via a communication line, an authentication server for authenticating a client to identify the client to an authentication terminal for inputting authentication information required for the personal authentication, wherein:

the system has a database for storing at least personal authentication data required for the personal authentication and previously registered, settling account information required to process charges, and data required to receive various services, and the authentication server has a step of collating the authentication information input from the authentication terminal via the communication line, against the personal authentication data stored in the database, a step of processing charges based on the settling account information registered in the data base based on a request from the authentication terminal when the client is authenticated during the identification, and a step of providing, registering, and managing personal data registered beforehand in the database based on a request from the authentication terminal when the client is authenticated during the identification and periodically communicating a collation history, a personal data usage history, and a charge process history.

That is, the personal authentication system of the present invention is characterized by being an online credit service comprising a communication line, and an authentication server, a client terminal, and an authentication terminal each connected to the communication line.

The authentication server registers and manages personal authentication data for identifying a client, a settling account for processing charges, and other data required to receive various services. The authentication server also has the function of collating the personal authentication data based on a request from the authentication terminal, processing charges for an identified individual from a previously registered settling account based on a request from the authentication terminal, providing, registering, and managing personal data registered previously for the authenticated individual as required based on a request from the authentication terminal, and periodically communicating a collation history, a personal data usage history, and a charge process history to the client terminal.

The personal authentication by the authentication server may be based on the client's fingerprint, voiceprint, or iris pattern. The personal authentication is also possible with a password input by the client.

A method for communicating the personal data, the collation history, the personal data usage history, and the charge process history to the client terminal may be based on electronic mails or home pages.

The authentication terminal or its functions may be installed at stores, ticket gates of transportation facilities, public telephones, hospital clerks' windows, government officers' windows, various service providing facilities such as libraries and sports gyms, entrances to or exits from facilities such as private and corporate premises and buildings for which entries and exits are limited, etc.

The present invention thereby provides the personal authentication service, and in particular, authenticates a client via a network such as the Internet and enables services as required; the services include the purchase of a commodity, the settlement of the consideration for a service, and the use of previously registered personal data.

DESCRIPTION OF THE PREFERRED EMBODIMENT

Figure 1:
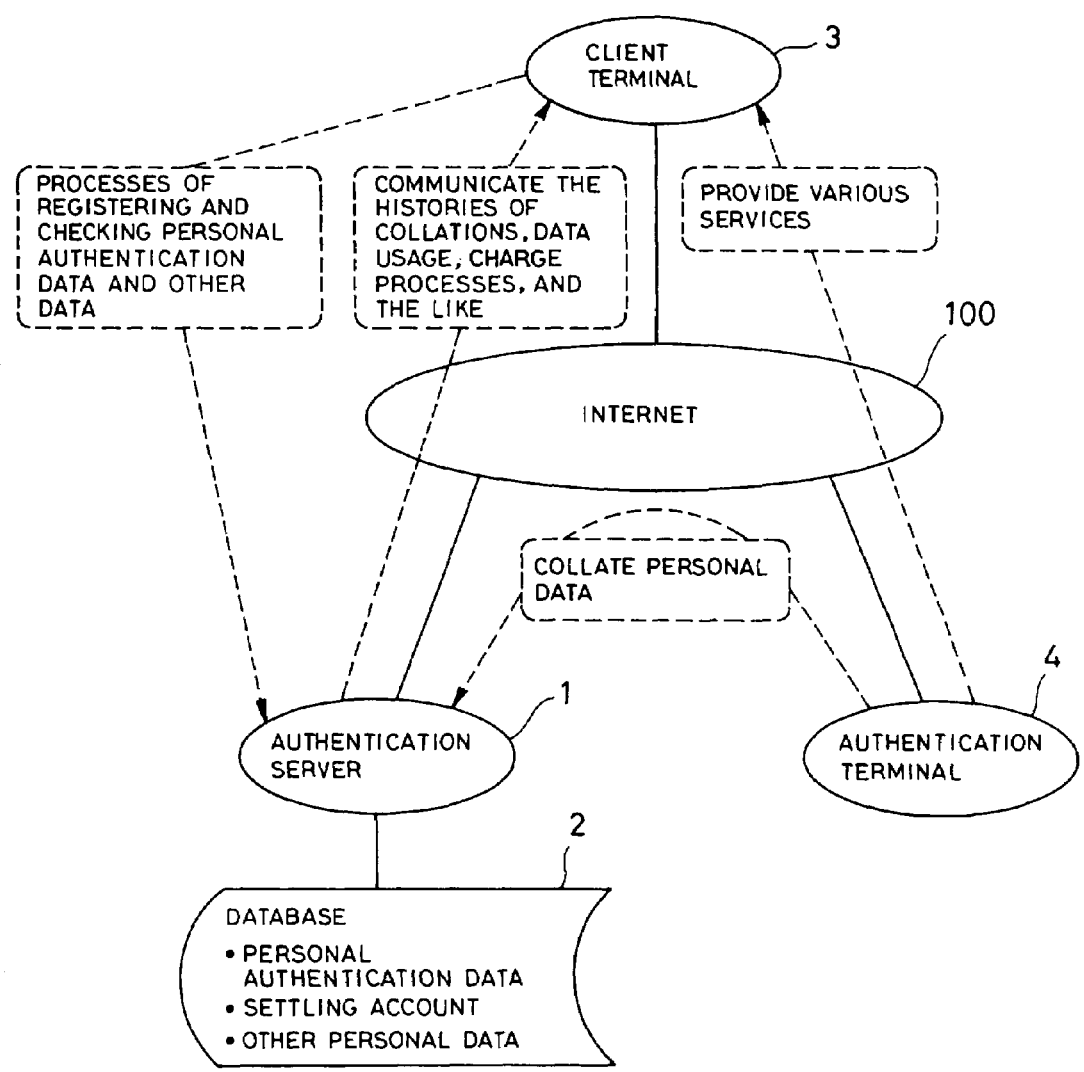
FIG. 1 is a block diagram showing the configuration of a personal authentication system according to a first embodiment of the present invention.

Next, embodiments of the present invention will be described with reference to the drawings. FIG. 1 is a block diagram of the configuration of a personal authentication system according to a first embodiment of the present invention. In FIG. 1, the personal authentication system according to the first embodiment of the present invention comprises an authentication server 1, a database 2, a client terminal 3, and an authentication terminal 4, wherein the authentication server 1, the client terminal 3, and the authentication terminal 4 are connected together via a communication line 100 such as the Internet.

If the personal authentication system according to the first embodiment of the present invention is used, a client first registers personal authentication data identifying him, a settling account for paying considerations for commodities or services purchased by the client, and personal data required for various services provided by the authentication server 1, in the database 2 connected to the authentication server 1, by means of a process using the customer terminal 3 or a terminal (not illustrated) connected to the authentication server 1 via the communication line 100 such as the Internet, or by mail, facsimile, or other offline means.

Subsequently, the client sends data identifying him to the authentication server 1 using the authentication terminal 4. The authentication server 1 collates the data sent from the authentication terminal 4 against personal authentication data registered in the database 2 to identify the client and sends the result to the authentication terminal 4.

Further, after the authentication, when the client uses the authentication terminal 4 as required to request the authentication server 1 to pay charges from the settling account registered previously in the database 2 of the authentication server 1, the authentication server 1 executes a process based on the sent request.

The client also uses the authentication terminal 4 as required to request the authentication server 1 to execute a read or modification of the personal data registered previously in the database 2 of the authentication server, new registration of such data, or the like, and the authentication server 1 executes a process based on the sent request. The authentication server 1 communicates the histories of personal authentication collations and accesses to the personal data to the client.

Figure 2:
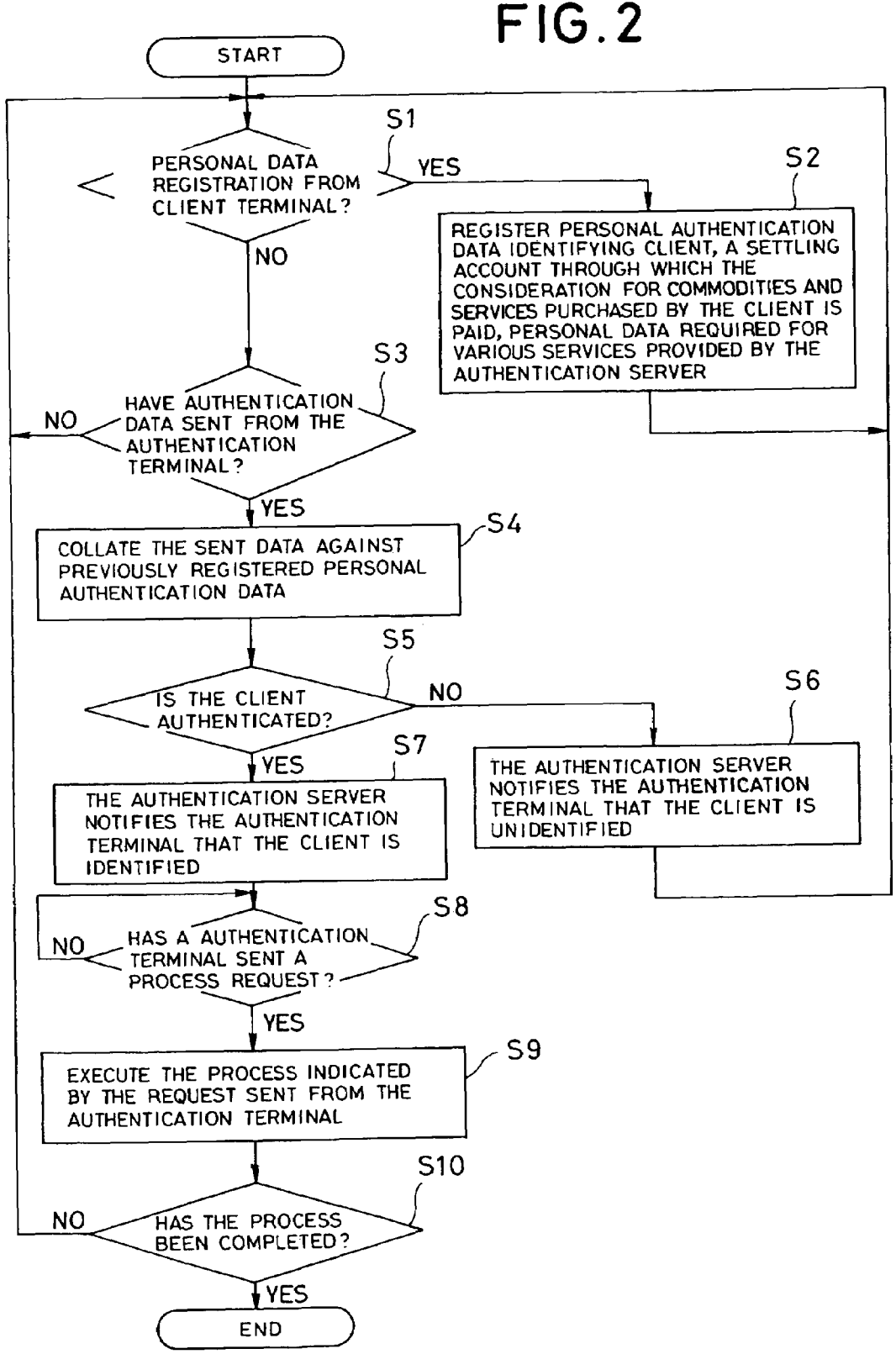
FIG. 2 is a flowchart showing a process operation by the authentication server in FIG. 1.
Figure 3:
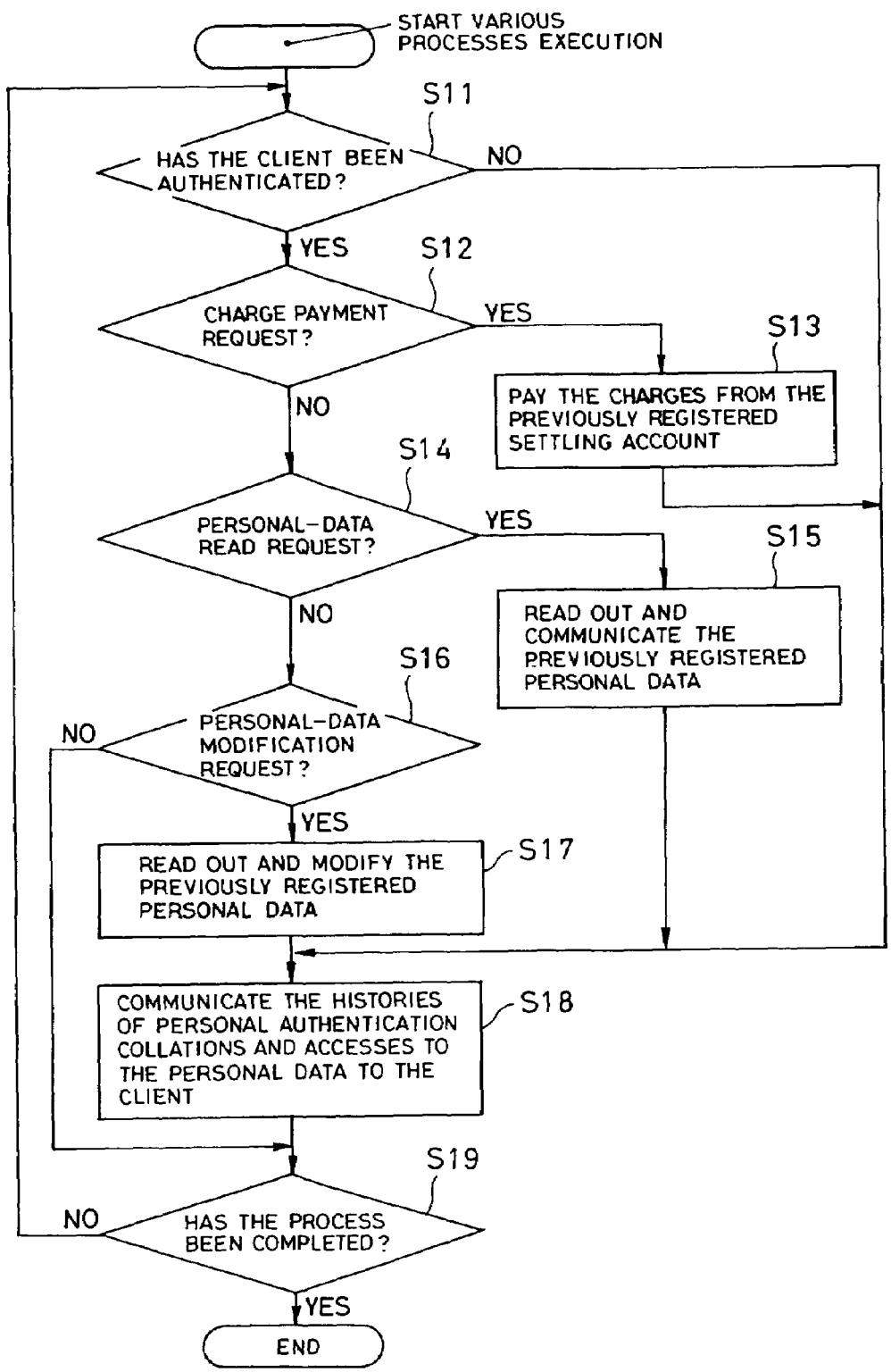
FIG. 3 is a flowchart showing a process operation by the authentication server in FIG. 1.

FIGS. 2 and 3 are flowcharts showing the processing operation of the authentication server 1 in FIG. 1. The processing operation of the personal authentication system according to the first embodiment of the present invention will be described with reference to FIGS. 1 to 3.

To register the personal data from the client terminal 3 (step S1 in FIG. 2), the authentication server 1 registers, in the database 2, the personal authentication data identifying the client, the settling account for paying the considerations for commodities and services purchased by the client, and the other personal data required for various services provided by the authentication server 1 (step S2 in FIG. 2). Alternatively, if personal authentication data have been sent from the authentication terminal 4 (step S3 in FIG. 2), the authentication server 1 collates the sent data against the personal authentication data registered in the database 2 (step S4 in FIG. 2) to identify the client (step S5 in FIG. 2).

When the authentication server 1 detects a mismatch in this personal authentication, it notifies the authentication terminal 4 that the client is unidentified (step S6 in FIG. 2). When the authentication server 1 detects a match, it notifies the authentication terminal 4 that the client is identified (step S7 in FIG. 2).

After the authentication server 1 has notified the authentication terminal 4 that the client is identified, that is, when it receives a process request from the authentication terminal 4 after the authentication (step S8 in FIG. 2), it executes the process indicated in the sent request (step S9 in FIG. 2). The authentication server 1 repeats the above process operation until the process is completed (step S10 in FIG. 2).

On the other hand, if the authentication server 1 executes the process requested by the authentication terminal 4, it first checks whether the client has been authenticated (step S11 in FIG. 3) and if he has been authenticated, determines the type of the request.

If the request is for charge payment (step S12 in FIG. 3), the process of paying charges from the settling account registered previously in the database 2 is executed (step S13 in FIG. 3). If the request is for a read of the personal data (step S14 in FIG. 3, the authentication server 1 reads out the personal data registered previously in the database 2 and then communicates the readout data (step S15 in FIG. 3). If the request is for a modification of the personal data (step S16 in FIG. 3), the authentication server 1 reads out and modifies the personal data registered previously in the database 2 to renew the contents of the database 2 (step S17 in FIG. 3).

After executing the process corresponding to the above-mentioned request, the authentication server 1 communicates the histories of personal authentication collations and accesses to personal data from the database 2 to the client (step S18 in FIG. 3). The authentication server 1 repeats the above process operation until the process is completed (step S19 in FIG. 3).

In this manner, the authentication server 1 can authenticate the client via the network such as the Internet and execute services also via the network as required, the services including the purchase of a commodity, the settlement of the consideration for a service, and the use of the previously registered personal data. This avoids the situation where the client cannot receive a service because he fails to carry his card or the like with him or loses it, thus preventing the abuse of the card or the like by a third person and the leakage of the personal information.

Figure 4:
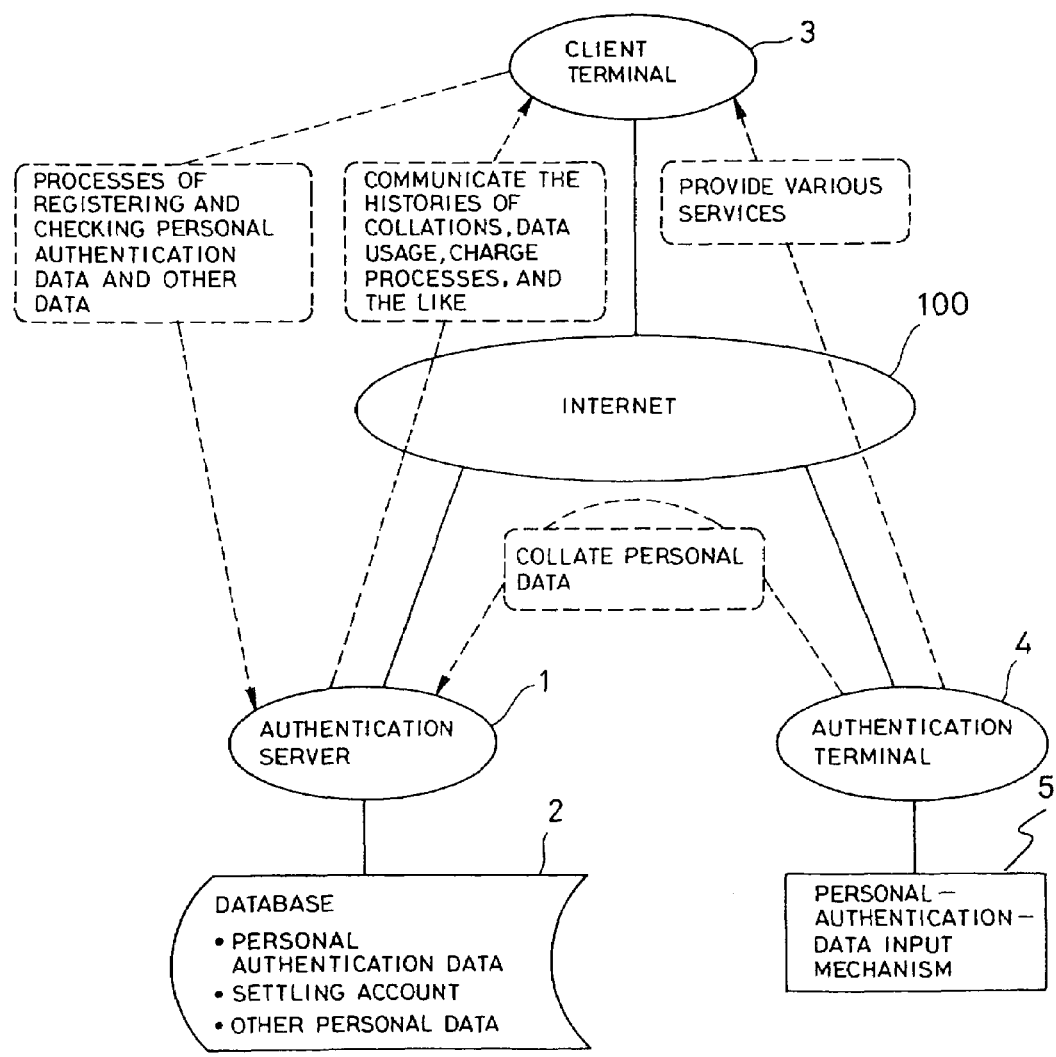
FIG. 4 is a block diagram showing the configuration of a personal authentication system according to a second embodiment of the present invention.

FIG. 4 is a block diagram showing the configuration of a personal authentication system according to a second embodiment of the present invention. In FIG. 4, the personal authentication system according to the second embodiment of the present invention has a configuration similar to that of the personal authentication system according to the first embodiment of the present invention except for a personal authentication data input mechanism 5, and the same components are denoted by the same reference numerals. Further, the same components perform operations similar to those in the personal authentication system according to the first embodiment of the present invention.

The personal authentication data input mechanism 5 is used to input individual data specific to the client such as his fingerprint, voiceprint, or iris pattern, which is used as the personal authentication data. A password input by the client can be input from either the authentication terminal 4 or the personal authentication data input mechanism 5.

Figure 5:
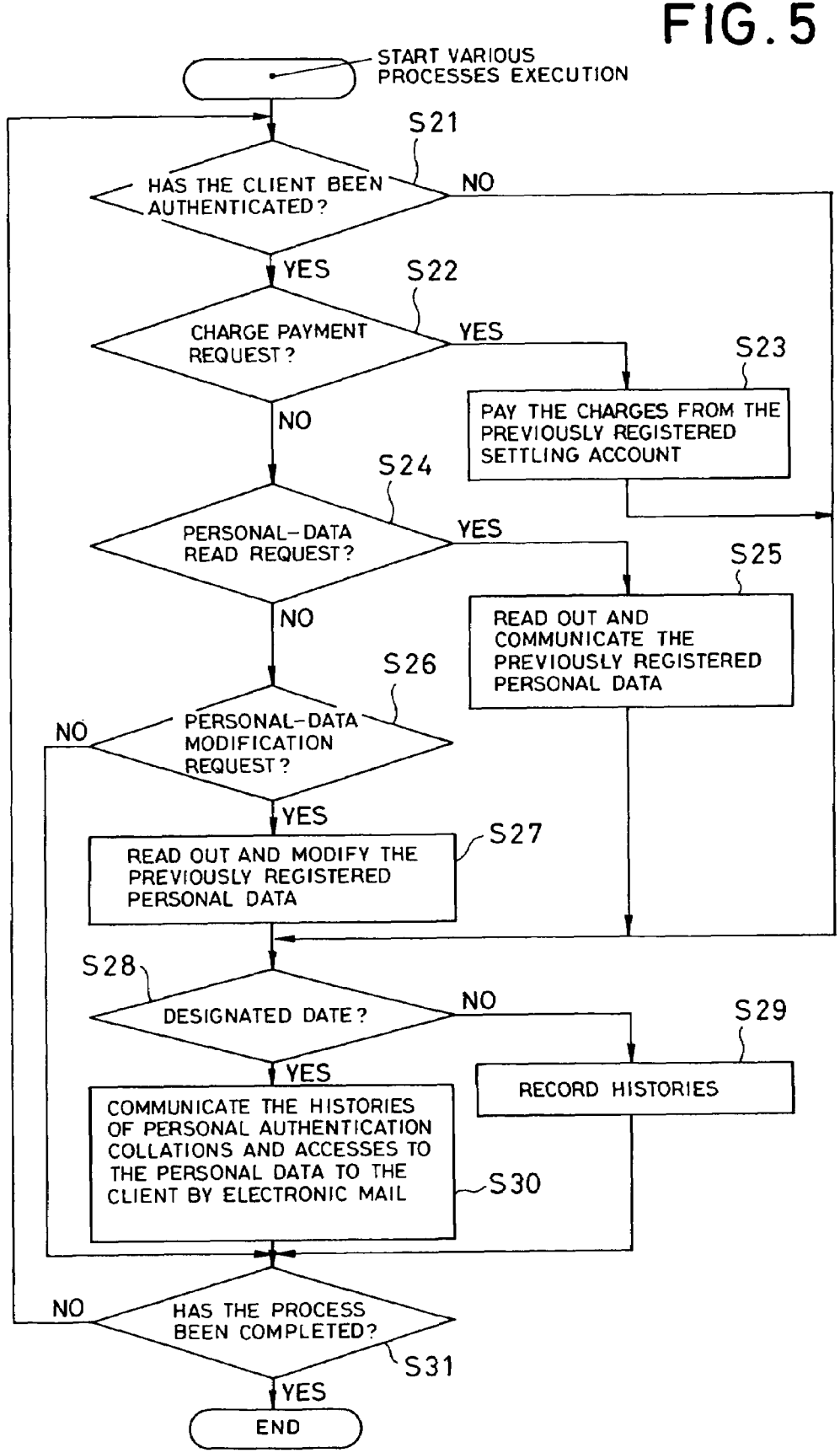
FIG. 5 is a flowchart showing a process operation by the authentication server according to a third embodiment of the present invention.

FIG. 5 is a flowchart showing the process operation of an authentication server according to a third embodiment of the present invention. The process operation of a personal authentication system according to the third embodiment of the present invention will be described with reference to FIG. 5. The steps in FIG. 5 other than steps S28 and S29 are similar to steps S11 to S17 and S19 in FIG. 3, so the description of the operations of these steps is omitted. Further, the configuration of the personal authentication system according to the third embodiment of the present invention is similar to that of the personal authentication system according to the first embodiment of the present invention shown in FIG. 1 or the personal authentication system according to the second embodiment of the present invention shown in FIG. 4, so its description is omitted.

The personal authentication system according to the third embodiment of the present invention periodically communicates the histories of personal authentication collations and accesses to personal data to the client by electronic mail at preset specified dates and times (for example, once per month) (step S28 in FIG. 5). At the times other than the preset specified dates and times (for example, once per month) (step S28 in FIG. 5), the histories are recorded (step S29 in FIG. 5). The histories of personal authentication collations and accesses to personal data may be communicated each time a process (an access) is completed.

Figure 6:
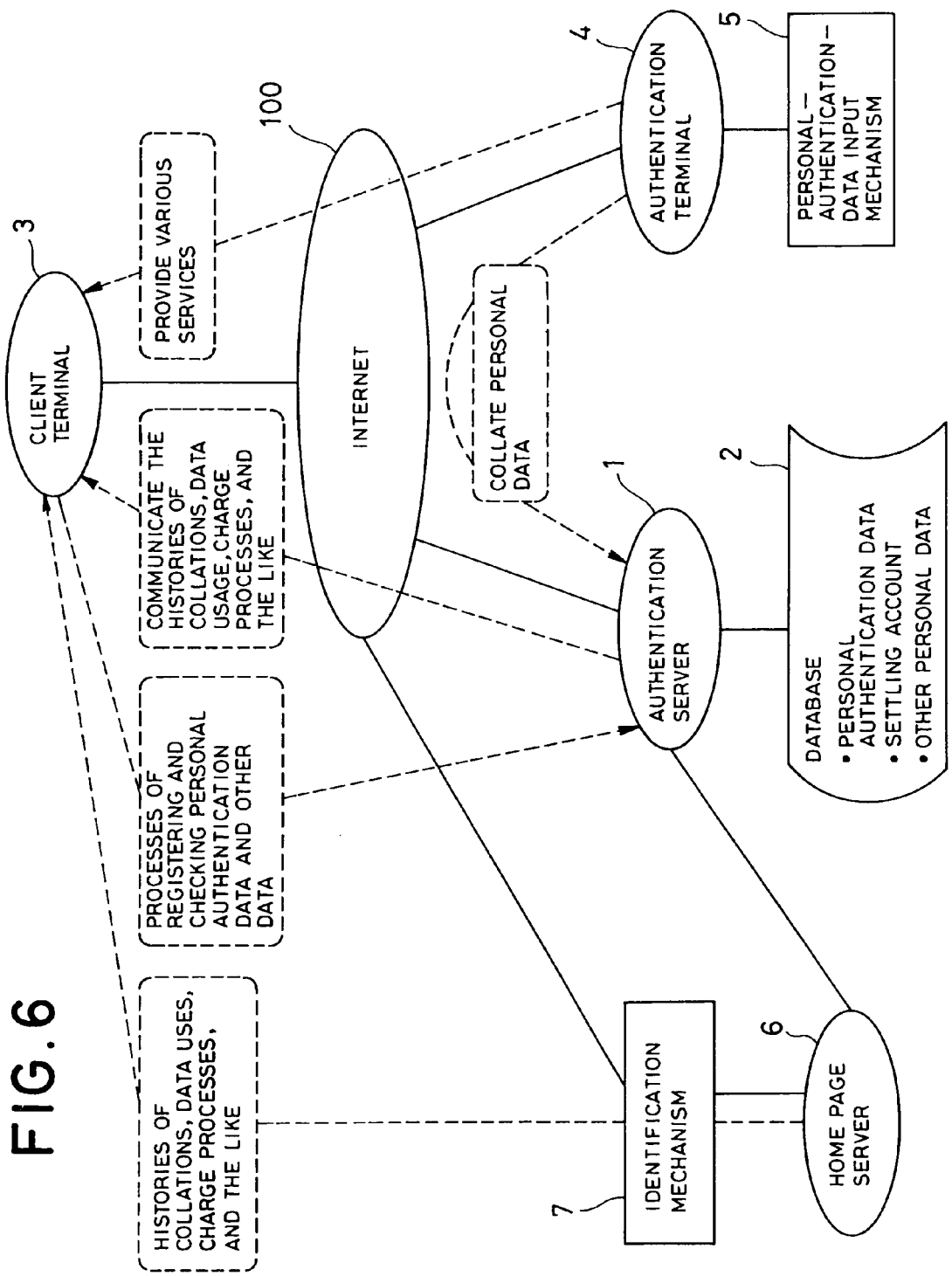
FIG. 6 is a block diagram showing the configuration of a personal authentication system according to a fourth embodiment of the present invention.

FIG. 6 is a block diagram showing the configuration of a personal authentication system according to a fourth embodiment of the present invention. In FIG. 6, the personal authentication system according to the fourth embodiment of the present invention has a configuration similar to that of the personal authentication system according to the second embodiment of the present invention except for a home page server 6 for showing home pages and an identification mechanism 7 such as a fire wall, and the same components are denoted by the same reference numerals. The same components perform operations similar to those in the personal authentication system according to the second embodiment of the present invention.

The home page server 6 is installed so as to be connected to the authentication server 1 and is connected to the Internet 100 via the identification mechanism 7. The home page server 6 also shows home pages describing the histories of personal authentication collations and accesses to personal data.

The identification mechanism 7 is connected to the home page server 6 using identification security measures such as cryptography or passwords so as to prevent third people's references. Thus, when the client terminal 3 is identified by the identification mechanism 7, it can read out the histories of personal authentication collations and accesses to personal data by viewing the client's home page from the home page server 6 through the Internet 100.

Figure 7:
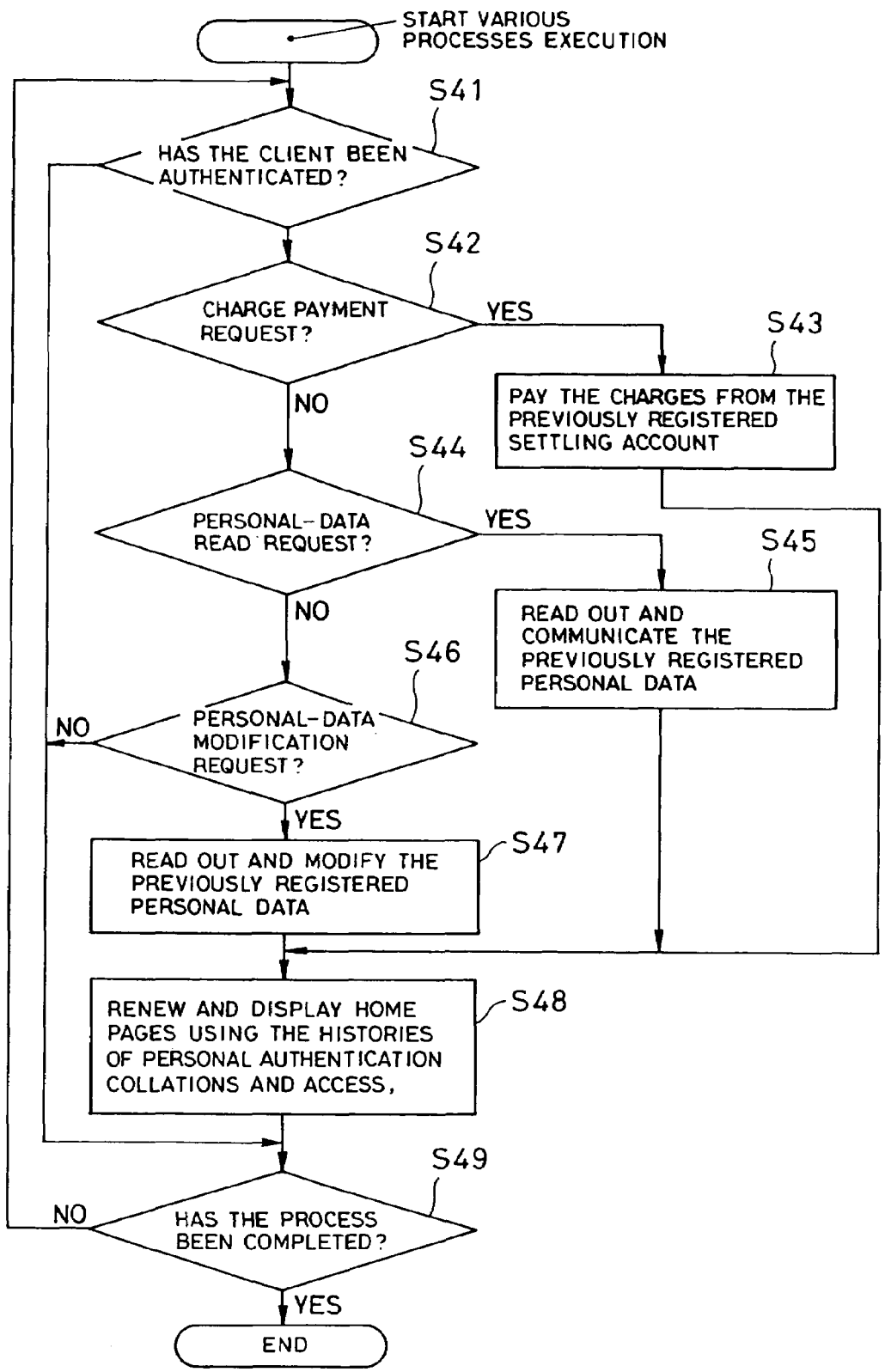
FIG. 7 is a flowchart showing a process operation by the authentication server in FIG. 6.

FIG. 7 is a flowchart showing the process operation of the authentication server 1 in FIG. 6. The process operation of the personal authentication system according to the third embodiment of the present invention will be described with reference to FIG. 7. The steps in FIG. 7 other than step S48 are similar to steps S11 to S17 and S19 in FIG. 3, so the description of the operations of these steps is omitted.

Once the request from the authentication terminal 4 has been completed, the authentication server 1 renews the contents of the home page with the results of the process, that is, the histories of personal authentication collations and accesses to personal data before displaying them (step S48 in FIG. 7). This allows the latest data to be always displayed on the home page corresponding to the client.

Figure 8:
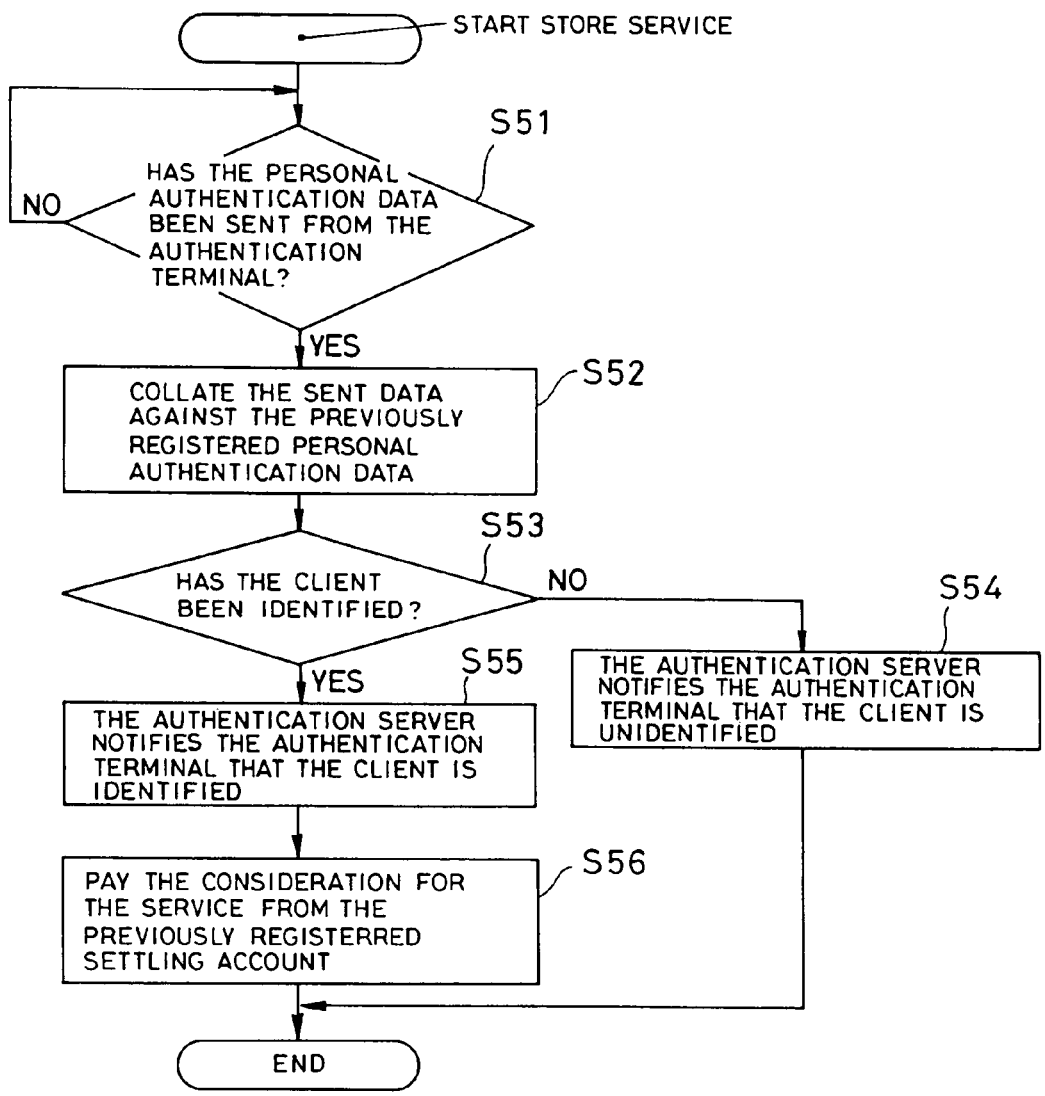
FIG. 8 is a flowchart showing a process operation by the authentication server according to a fifth embodiment of the present invention.

FIG. 8 is a flowchart showing the process operation of the authentication server according to a fifth embodiment of the present invention. The process operation of the authentication server according to the fifth embodiment of the present invention will be described with reference to FIG. 8. A personal authentication system according to the fifth embodiment of the present invention is an example of the application to store services of the personal authentication system according to the first embodiment of the present invention shown in FIG. 1, the personal authentication system according to the second embodiment of the present invention shown in FIG. 4, or the personal authentication system according to the fourth embodiment of the present invention shown in FIG. 6. The configuration and operation of this system are similar to those of the personal authentication systems according to the first to fourth embodiments, so the description of the configuration and operation is omitted.

In the personal authentication system according to the fifth embodiment of the present invention, the authentication terminal 4 is installed in a store so that the client can obtain a commodity or receive a service in this store. To pay the consideration for the commodity or service, the client collates personal authentication data such as his fingerprint, voiceprint, iris pattern, or password collated using the authentication terminal 4 connected to the authentication server 1 via the communication line 100 such as the Internet, the authentication data being previously registered in the database 2 of the authentication server 1, and then requests the authentication server 1 to pay the consideration from the settling account registered in the authentication server 1. The authentication server 1 identifies the client using data sent from the authentication terminal 4 and then executes the payment process based on the sent request.

That is, if personal authentication data have been sent from the authentication terminal 4 (step S51 in FIG. 8), the authentication server 1 collates the sent data against the previously registered personal authentication data (step S52 in FIG. 8) to identify the client (step S53 in FIG. 8).

When the authentication server 1 detects a mismatch in this personal authentication, it notifies the authentication terminal 4 that the client is unidentified (step S54 in FIG. 8). When the authentication server 1 detects a match, it notifies the authentication terminal 4 that the client is identified (step S55 in FIG. 8). After detecting the match, the authentication server 1 pays the consideration from the settling account registered previously in the database 2 (step S56 in FIG. 8).

Thus, if the client uses a service from a credit company to purchase a commodity or receive a service, the credit card, which is conventionally common, is not required. This avoids the situation where the client cannot receive the service because he fails to carry his credit card with him or loses it, thus preventing the abuse of the lost credit card.

Further, if the client uses a service from a credit company to purchase a commodity or receive a service online via the Internet or the like, he is not required to input the number of his credit card, the issued year and date, his password, or the like as in the prior art. This avoids the situation where the client cannot receive the service because he forgets these pieces of information. Additionally, since these pieces of information are not required, the abuse of the information by a third person is prevented.

Figure 9:
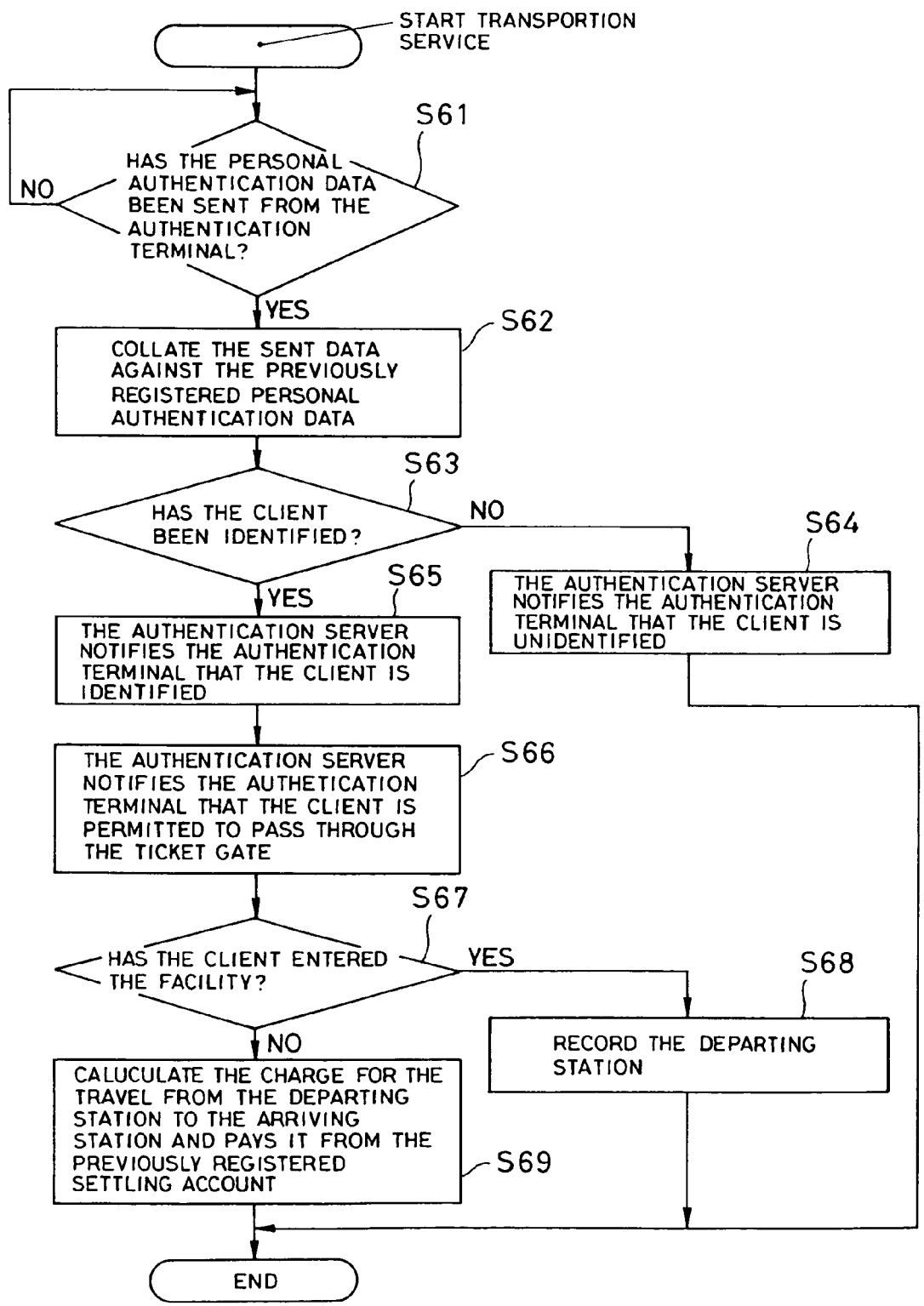
FIG. 9 is a flowchart showing a process operation by the authentication server according to a sixth embodiment of the present invention.

FIG. 9 is a flowchart showing the process operation of an authentication server according to a sixth embodiment of the present invention. The process operation of the authentication server according to the sixth embodiment of the present invention will be described with reference to FIG. 9. The configuration and operation of a personal authentication system according to the sixth embodiment of the present invention are an example of the application to transportation services of the personal authentication system according to the first embodiment of the present invention shown in FIG. 1, the personal authentication system according to the second embodiment of the present invention shown in FIG. 4, or the personal authentication system according to the fourth embodiment of the present invention shown in FIG. 6. The configuration and operation of this system are similar to those of the personal authentication systems according to the first to fourth embodiments, so the description of the configuration and operation is omitted.

In the personal authentication system according to the sixth embodiment of the present invention, the authentication terminal 4 is installed at a ticket gate of a public transportation facility. When passing through the ticket gate, the client undergoes the personal authentication in accordance with a procedure similar to that described above.

If the client is authenticated by the authentication server 1 as a result of its collation operation, the authentication terminal 4 automatically or manually permits the client to pass through the ticket gate. In addition, if the client enters the public transportation facility, the authentication terminal records the departing station, while if he leaves the public transportation facility, the authentication terminal pays the charge for the travel from a departing station to the arriving station, from the settling account registered previously in the database of the authentication server 1. The recording of the departing station, the calculation of the charge for the travel to the arriving station, and the like may additionally be executed by the authentication server 1 or may be executed by a server provided separately by the public transportation facility.

That is, if personal authentication data have been sent from the authentication terminal 4 (step S61 in FIG. 9), the authentication server 1 collates the sent data against the previously registered personal authentication data (step S62 in FIG. 9) to identify the client (step S63 in FIG. 9).

When the authentication server 1 detects a mismatch in this personal authentication, it notifies the authentication terminal 4 that the client is unidentified (step S64 in FIG. 9). When the authentication server 1 detects a match, it notifies the authentication terminal 4 that the client is identified (step S65 in FIG. 9).

After detecting the match, the authentication server 1 notifies the authentication terminal 4 that the client is allowed to pass through the ticket gate (step S66 in FIG. 9). If the client is to enter the facility through the ticket gate (step S67 in FIG. 9), the authentication server 1 records the departing station (step S68 in FIG. 9).

Additionally, if the client is determined not to enter the facility through the ticket gate (step S67 in FIG. 9), the authentication server 1 calculates the charge for the travel from the departing station to the arriving station and pays the charge from the settling account registered previously in the database 2 (step S69 in FIG. 9).

This avoids the situation where the client cannot receive the service because he fails to carry his commuter pass or ticket with him or loses it, thus preventing the abuse of the lost commuter pass or ticket.

Further, if the client uses a service from a credit company to receive the service from the public transportation facility, the credit card, which is conventionally common, is not required. This avoids the situation where the client cannot receive the service because he fails to carry his credit card with him or loses it. The abuse of the lost credit card is also prevented.

Figure 10:
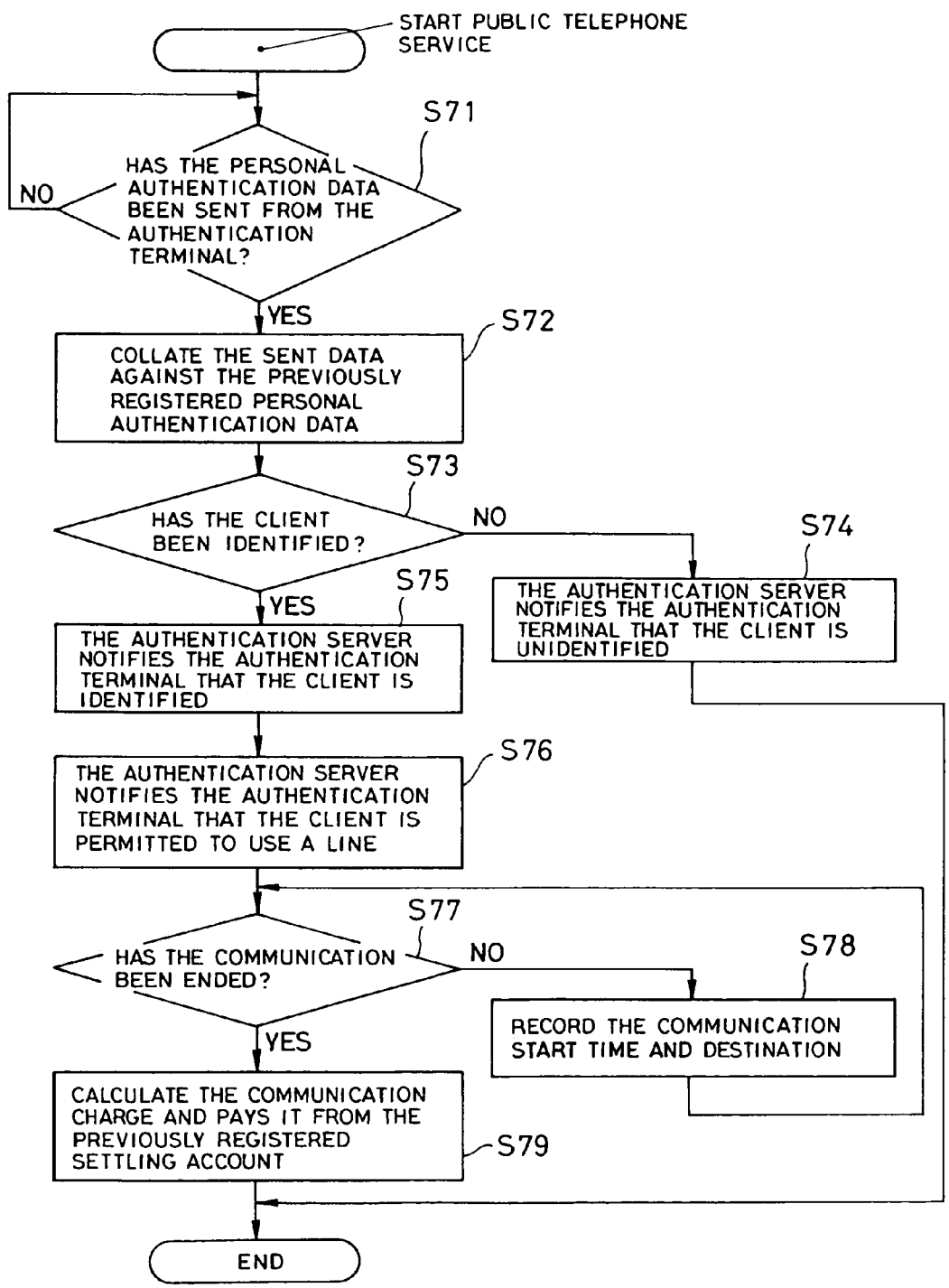
FIG. 10 is a flowchart showing a process operation by the authentication server according to a seventh embodiment of the present invention.

FIG. 10 is a flowchart showing the process operation of an authentication server according to a seventh embodiment of the present invention. The process operation of the authentication server according to the seventh embodiment of the present invention will be described with reference to FIG. 10. The configuration and operation of a personal authentication system according to the seventh embodiment of the present invention are an example of the application to public telephone services of the personal authentication system according to the first embodiment of the present invention shown in FIG. 1, the personal authentication system according to the second embodiment of the present invention shown in FIG. 4, or the personal authentication system according to the fourth embodiment of the present invention shown in FIG. 6. The configuration and operation of this system are similar to those of the personal authentication systems according to the first to fourth embodiments, so the description of the configuration and operation is omitted.

In the personal authentication system according to the seventh embodiment of the present invention, the functions of the authentication terminal 4 are added to a public telephone. When using the public telephone, the client undergoes the personal authentication in accordance with a procedure similar to that described above.

If the client is authenticated by the authentication server 1 as a result of collation in the database 2 of the authentication server 1, the public telephone permits the use of a line. The public telephone also records the communication start time and the destination, and once the communication is ended, obtains the communication charge from the settling account registered previously in the database 2 of the authentication server 1. The recording of the communication time and destination, the calculation of the communication charge, and the like may additionally be executed by the authentication server 1 or may be executed by a public telephone or a separate server connected to the public telephone.

That is, if personal authentication data have been sent from the authentication terminal 4 (step S71 in FIG. 10), the authentication server 1 collates the sent data against the previously registered personal authentication data (step S72 in FIG. 10) to identify the client (step S73 in FIG. 10).

When the authentication server 1 detects a mismatch in this personal authentication, it notifies the authentication terminal 4 that the client is unidentified (step S74 in FIG. 10). When the authentication server 1 detects a match, it notifies the authentication terminal 4 that the client is identified (step S75 in FIG. 10).

After detecting the match, the authentication server 1 notifies the authentication terminal 4 that the client is allowed to use a line (step S76 in FIG. 10). If the communication is not ended (step S77 in FIG. 10), the authentication server 1 records the communication start time and destination (step S78 in FIG. 10) and returns to the determination of whether the communication is ended.

Additionally, if the communication is ended (step S77 in FIG. 10), the authentication server 1 calculates the communication charge and pays the charge from the settling account registered previously in the database 2 (step S79 in FIG. 10).

In this manner, when the client uses a general public line service, he can pay the charge without depending on settlement using cash, a prepaid card, a credit card, or the like, which is conventionally common. This prevents the situation where the client cannot use a line because he fails to carry his prepaid card or the like with him. Additionally, no prepaid or credit card is required, thus preventing the forgery or illegal use of such a card.

Figure 11:
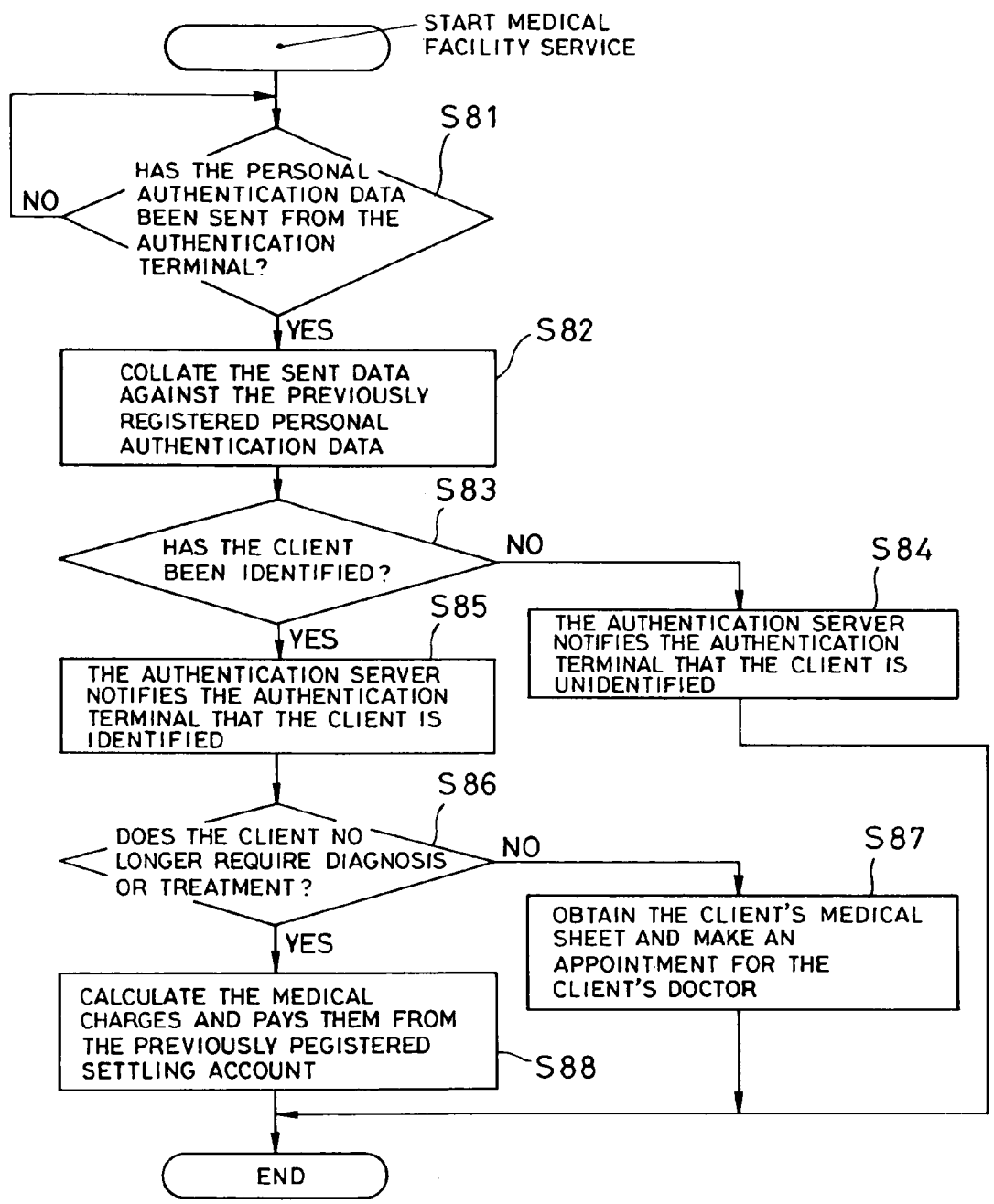
FIG. 11 is a flowchart showing a process operation by the authentication server according to an eighth embodiment of the present invention.

FIG. 11 is a flowchart showing the process operation of an authentication server according to an eighth embodiment of the present invention. The process operation of the authentication server according to the eighth embodiment of the present invention will be described with reference to FIG. 11. The configuration and operation of a personal authentication system according to the eighth embodiment of the present invention are an example of the application to medical services of the personal authentication system according to the first embodiment of the present invention shown in FIG. 1, the personal authentication system according to the second embodiment of the present invention shown in FIG. 4, or the personal authentication system according to the fourth embodiment of the present invention shown in FIG. 6. The configuration and operation of this system are similar to those of the personal authentication systems according to the first to fourth embodiments, so the description of the configuration and operation is omitted.

In the personal authentication system according to the eighth embodiment of the present invention, the authentication terminal 4 is installed at a hospital clerk's window. At this window, the client undergoes the personal authentication in accordance with a procedure similar to that described above.

If the client is authenticated by the authentication server 1 as a result of collation in the database 2 of the authentication server 1, the authentication terminal 4 automatically or manually provides the client's medical sheet and assigns the client to an appropriate doctor. After diagnosis or treatment, the client returns his medical sheet to the window and undergoes the personal authentication in accordance with a procedure similar to that described above. The client also pays the medical charges from the settling account registered previously in the database 2 of the authentication server 1. The calculation of the medical charges may additionally be executed by the authentication server 1 or may be executed by a server provided separately by the hospital.

That is, if personal authentication data have been sent from the authentication terminal 4 (step S81 in FIG. 11), the authentication server 1 collates the sent data against the previously registered personal authentication data (step S82 in FIG. 11) to identify the client (step S83 in FIG. 11).

When the authentication server 1 detects a mismatch in this personal authentication, it notifies the authentication terminal 4 that the client is unidentified (step S84 in FIG. 11). When the authentication server 1 detects a match, it notifies the authentication terminal 4 that the client is identified (step S85 in FIG. 11).

After detecting the match and if the client must continue to be diagnosed or treated (step S86 in FIG. 11), the authentication server 1 obtains the client's medical sheet and make an appointment with his doctor (step S87 in FIG. 11).

If the client no longer needs to be diagnosed or treated (step S86 in FIG. 11), the authentication server 1 calculates the medical charges and pays the charges from the settling account registered previously in the database 2 (step S88 in FIG. 11).

In this manner, when the client consults the doctor, no consultation card or the like which is issued specifically to the client by the hospital is required, thereby preventing the misappropriation of such a card or the forgery thereof leading to an abuse. Further, when the medical charges are to be paid, no credit card is required, thereby eliminating the need to carry such a card with the client.

Figure 12:
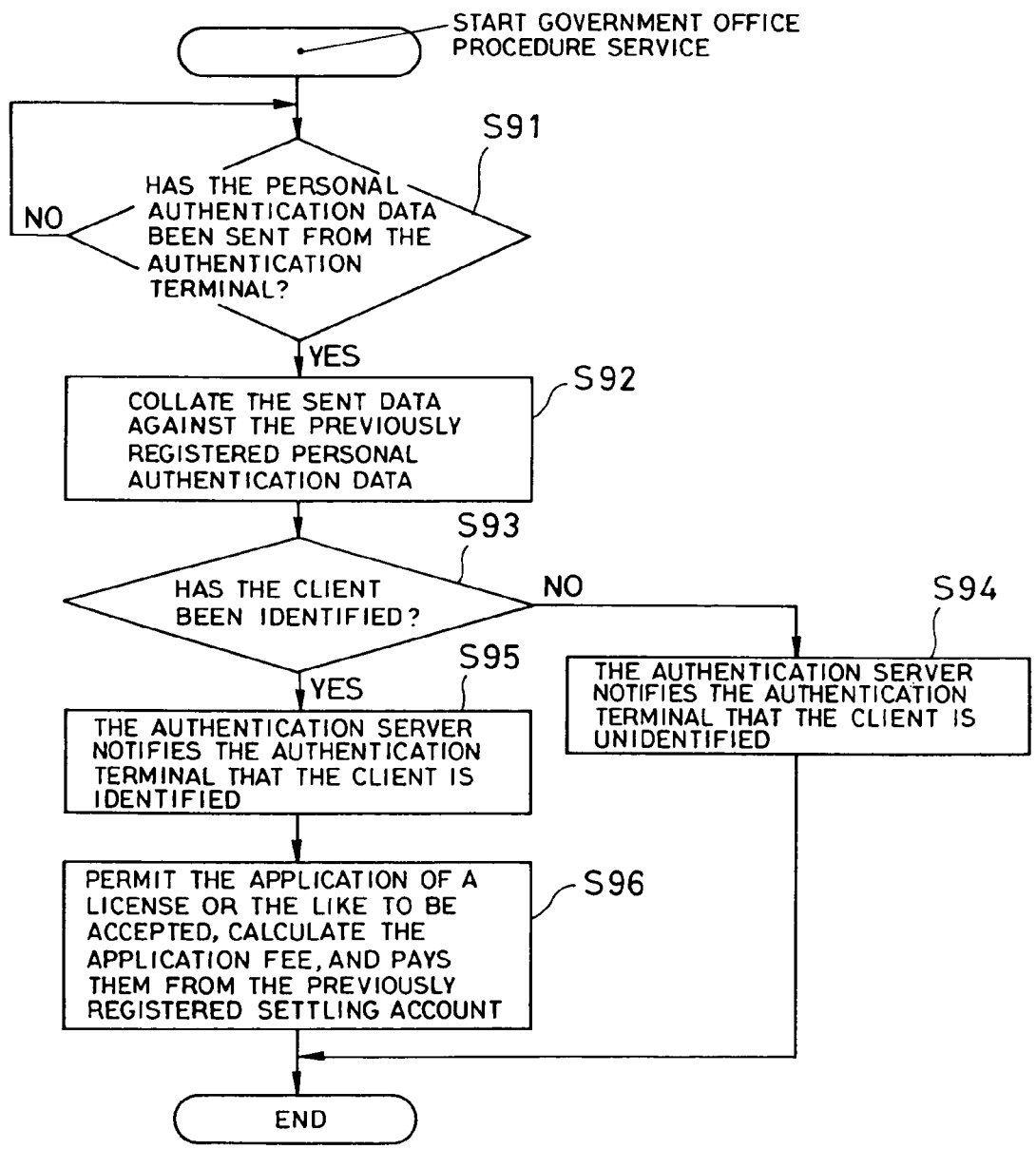
FIG. 12 is a flowchart showing a process operation by the authentication server according to a ninth embodiment of the present invention.

FIG. 12 is a flowchart showing the process operation of an authentication server according to a ninth embodiment of the present invention. The process operation of the authentication server according to the ninth embodiment of the present invention will be described with reference to FIG. 12. The configuration and operation of a personal authentication system according to the ninth embodiment of the present invention are an example of the application to government and municipal office services of the personal authentication system according to the first embodiment of the present invention shown in FIG. 1, the personal authentication system according to the second embodiment of the present invention shown in FIG. 4, or the personal authentication system according to the fourth embodiment of the present invention shown in FIG. 6. The configuration and operation of this system are similar to those of the personal authentication systems according to the first to fourth embodiments, so the description of the configuration and operation is omitted.

In the personal authentication system according to the ninth embodiment of the present invention, the authentication terminal 4 is installed at a government officer's window. If the client must be identified at this window, he undergoes the personal authentication in accordance with a procedure similar to that described above.

Further, if the client must submit a document such as a copy of the certificate of residence, a copy of the portion of the client's family register which relates to him, or a copy of his family register for various governmental procedures for licenses, then this submission is additionally executed by the authentication server 1 or is executed by a server provided separately by the government office.

That is, if personal authentication data have been sent from the authentication terminal 4 (step S91 in FIG. 12), the authentication server 1 collates the sent data against the previously registered personal authentication data (step S92 in FIG. 12) to identify the client (step S93 in FIG. 12).

When the authentication server 1 detects a mismatch in this personal authentication, it notifies the authentication terminal 4 that the client is unidentified (step S94 in FIG. 12). When the authentication server 1 detects a match, it notifies the authentication terminal 4 that the client is identified (step S95 in FIG. 12).

Upon detecting this match, the authentication server 1 permits the application for the license to be accepted, calculates the application fee, and pays the fee from the settling account registered previously in the database 2 (step S96 in FIG. 12).

In this manner, when the client applies to a government office for various licenses, he is not required to prepare a copy of the certificate of residence, a copy of the portion of the client's family register which relates to him, or a copy of his family register and can identify himself while simultaneously submitting these documents at the window.

Figure 13:
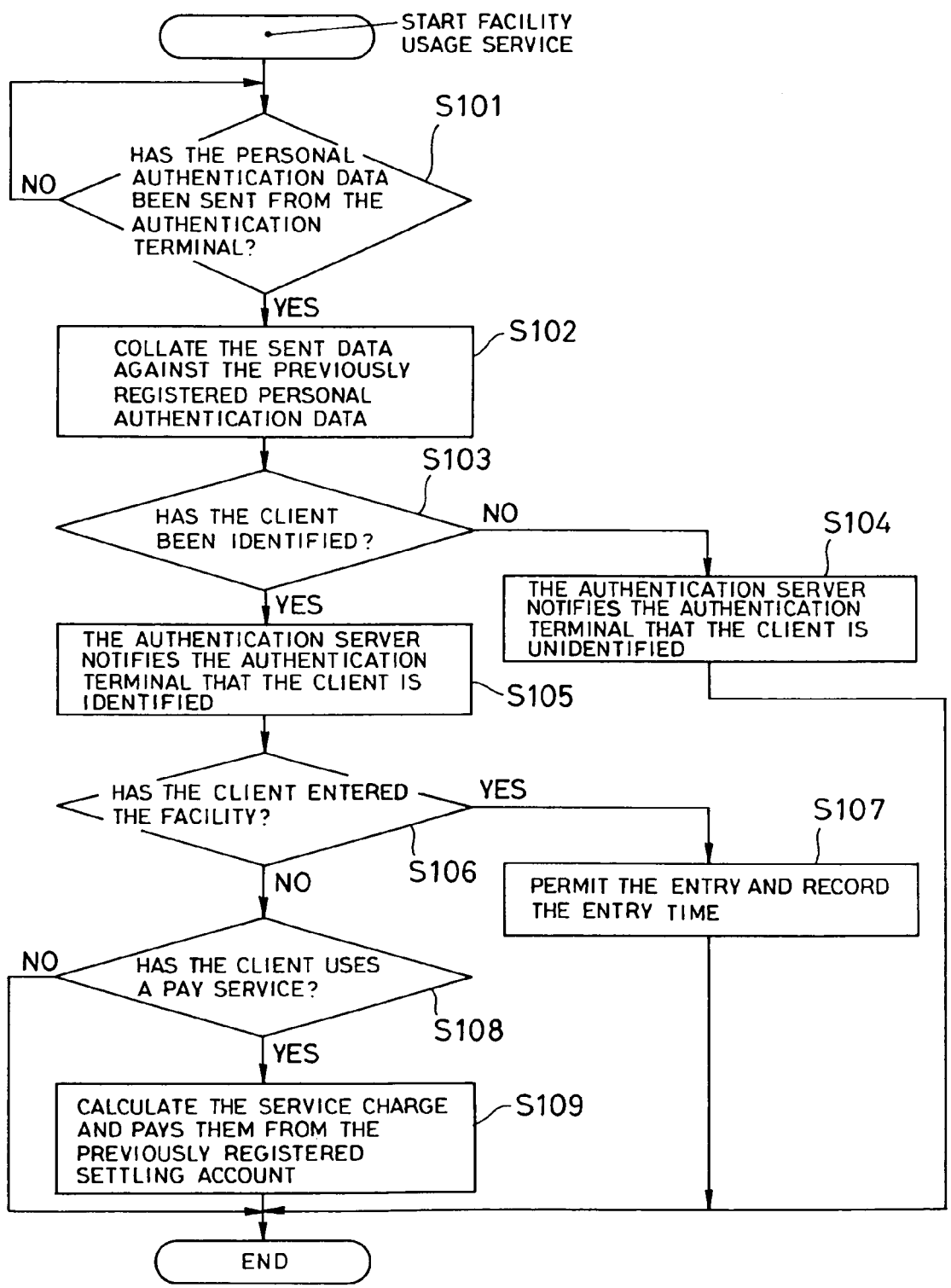
FIG. 13 is a flowchart showing a process operation by the authentication server according to a tenth embodiment of the present invention.

FIG. 13 is a flowchart showing the process operation of an authentication server according to a tenth embodiment of the present invention. The process operation of the authentication server according to the tenth embodiment of the present invention will be described with reference to FIG. 13. The configuration and operation of a personal authentication system according to the tenth embodiment of the present invention are an example of the application to facility usage services of the personal authentication system according to the first embodiment of the present invention shown in FIG. 1, the personal authentication system according to the second embodiment of the present invention shown in FIG. 4, or the personal authentication system according to the fourth embodiment of the present invention shown in FIG. 6. The configuration and operation of this system are similar to those of the personal authentication systems according to the first to fourth embodiments, so the description of the configuration and operation is omitted.

In the personal authentication system according to the tenth embodiment of the present invention, the authentication terminal 4 is installed in various service providing facilities such as libraries or sports gyms. At a reception of the facility, the client undergoes the personal authentication in accordance with a procedure similar to that described above.

If a charge process is required based on the management of the facility use time, borrowed books, or the like, the charges are paid from the settling account registered previously in the database 2 of the authentication server 1. The management of the facility use time, borrowed books, or the like may additionally be executed by the authentication server 1 or may be executed by a server provided separately by the service providing facility.

That is, if personal authentication data have been sent from the authentication terminal 4 (step S101 in FIG. 13), the authentication server 1 collates the sent data against the previously registered personal authentication data (step S102 in FIG. 13) to identify the client (step S103 in FIG. 13).

When the authentication server 1 detects a mismatch in this personal authentication, it notifies the authentication terminal 4 that the client is unidentified (step S104 in FIG. 13). When the authentication server 1 detects a match, it notifies the authentication terminal 4 that the client is identified (step S105 in FIG. 13).

When this match is detected and if the client is to enter the service providing facility such as a library or a sports gym (step S106 in FIG. 13), the authentication server 1 permits the client to enter the service providing facility and records the entry time (step S107 in FIG. 13).

If the client is not to enter the service providing facility such as a library or a sports gym (step S106 in FIG. 13), the authentication server 1 determines whether the client has used a pay service (step S108 in FIG. 13). In this case, the authentication server 1 may record the use each time the client used a pay service.

The authentication server 1 calculates the service charge if the client has used a pay service and pays the service charge from the settling account registered previously in the database 2 (step S109 in FIG. 13).

In this manner, if the client uses various service providing facilities, he is not required to carry with him a membership card or the like which is issued by each service facility. This avoids the situation where the client cannot receive the service because he fails to carry his membership card or the like with him or loses it.

The above management of entries to and exits from various service providing facilities is applicable to private or corporate premises, facilities, or the like for which entries and exits are limited. In this case, the authentication terminal 4 may be installed at the entrance to or the exit from private or corporate premises, facilities, or the like for which entries or exits are limited. In this case, the client undergoes the personal authentication in accordance with a procedure similar to that described above before entering or leaving the facility.

Additionally, the point of time when clients enter or leave the facility, the amount of time that the clients are in the facility, the number of clients who are currently in the facility, or the like are managed as required. This management may additionally be executed by the authentication server 1 or may be executed by a server provided separately by each facility.

In this manner, when the above configuration and operation are applied to entries to or exist from facilities for which the entries or exits are limited, the client is not required to present his entrance permit, ID card, or the like, thereby avoiding the situation where the client cannot enter or leave the facility because he fails to carry such a card with him or loses it. Further, a third person is prevented from illegally entering or leaving the facility if the card is lost or stolen.

Figure 14:
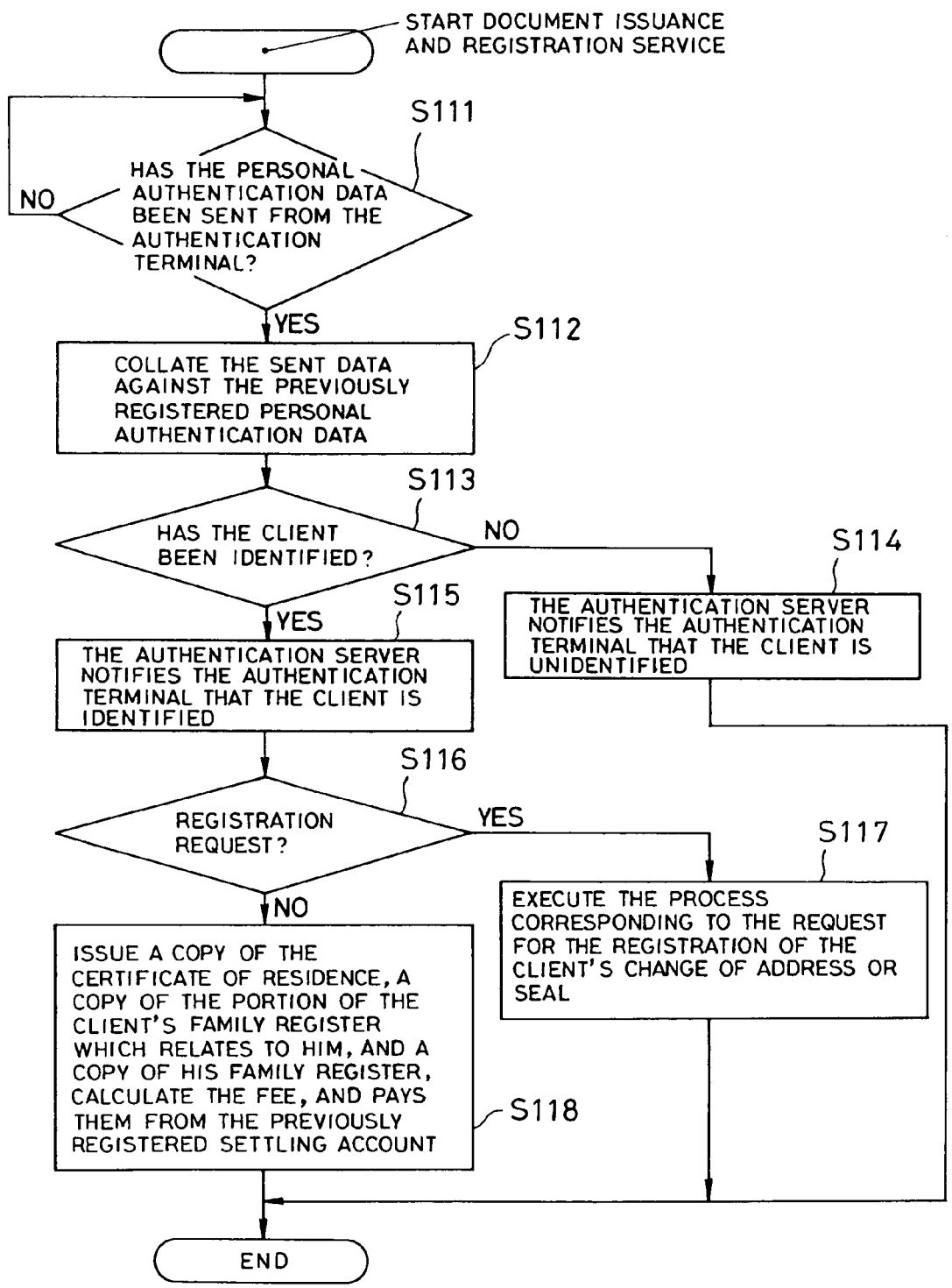
FIG. 14 is a flowchart showing a process operation by the authentication server according to an eleventh embodiment of the present invention.

FIG. 14 is a flowchart showing the process operation of an authentication server according to an eleventh embodiment of the present invention. The process operation of the authentication server according to the eleventh embodiment of the present invention will be described with reference to FIG. 14. The configuration and operation of a personal authentication system according to the eleventh embodiment of the present invention are an example of the application to document issuance and registration services of the personal authentication system according to the first embodiment of the present invention shown in FIG. 1, the personal authentication system according to the second embodiment of the present invention shown in FIG. 4, or the personal authentication system according to the fourth embodiment of the present invention shown in FIG. 6. The configuration and operation of this system are similar to those of the personal authentication systems according to the first to fourth embodiments, so the description of the configuration and operation is omitted.

In the personal authentication system according to the eleventh embodiment of the present invention, the authentication terminal 4 is installed at a city or ward officer's window for various procedures such as the issuance of a copy of the certificate of residence, a copy of the portion of the client's family register which relates to him, or a copy of his family register. At such a window, the client may not be strictly identified, causing procedures such as document issuance and registrations to be unfairly executed. Unfair processes can be eliminated by applying the present invention to these process operations. In this case, if the client must be identified at the window, the personal authentication is conducted in accordance with a procedure similar to that described above.

Further, the issuance documents such as a copy of the certificate of residence, a copy of the portion of the client's family register which relates to him, or a copy of his family register as well as registrations may additionally be executed by the authentication server 1 or may be executed by a server provided separately by the city or ward office.

That is, if personal authentication data have been sent from the authentication terminal 4 (step S111 in FIG. 14), the authentication server 1 collates the sent data against the previously registered personal authentication data (step S112 in FIG. 14) to identify the client (step S113 in FIG. 14).

When the authentication server 1 detects a mismatch in this personal authentication, it notifies the authentication terminal 4 that the client is unidentified (step S114 in FIG. 14). When the authentication server 1 detects a match, it notifies the authentication terminal 4 that the client is identified (step S115 in FIG. 14).

When this match is detected and if the request is for the registration of the client's change of address or his seal (step S116 in FIG. 14), the authentication server 1 executes the process corresponding to the request for the registration of the client's change of address or his seal (step S117 in FIG. 14).

If request is not for the registration of the client's change of address or his seal (step S116 in FIG. 14), the authentication server 1 determines that a document such as a copy of the portion of the client's family register which relates to him, or a copy of his family register is to be issued, and issues this document. The authentication server 1 then calculates the fee and pays it from the settling account registered previously in the database 2 (step S118 in FIG. 14).

This prevents the illegal issuance of a document such as a copy of the portion of the client's family register which relates to him, or a copy of his family register or the illegal registration of the client's change of address or his seal, thus eliminating the need to carry with the client his ID card such as his driver's license which authenticates him, or his registration card. This avoids the situation where the client cannot receive the service because he fails to carry his ID card or the like with him or loses it.

Figure 15:
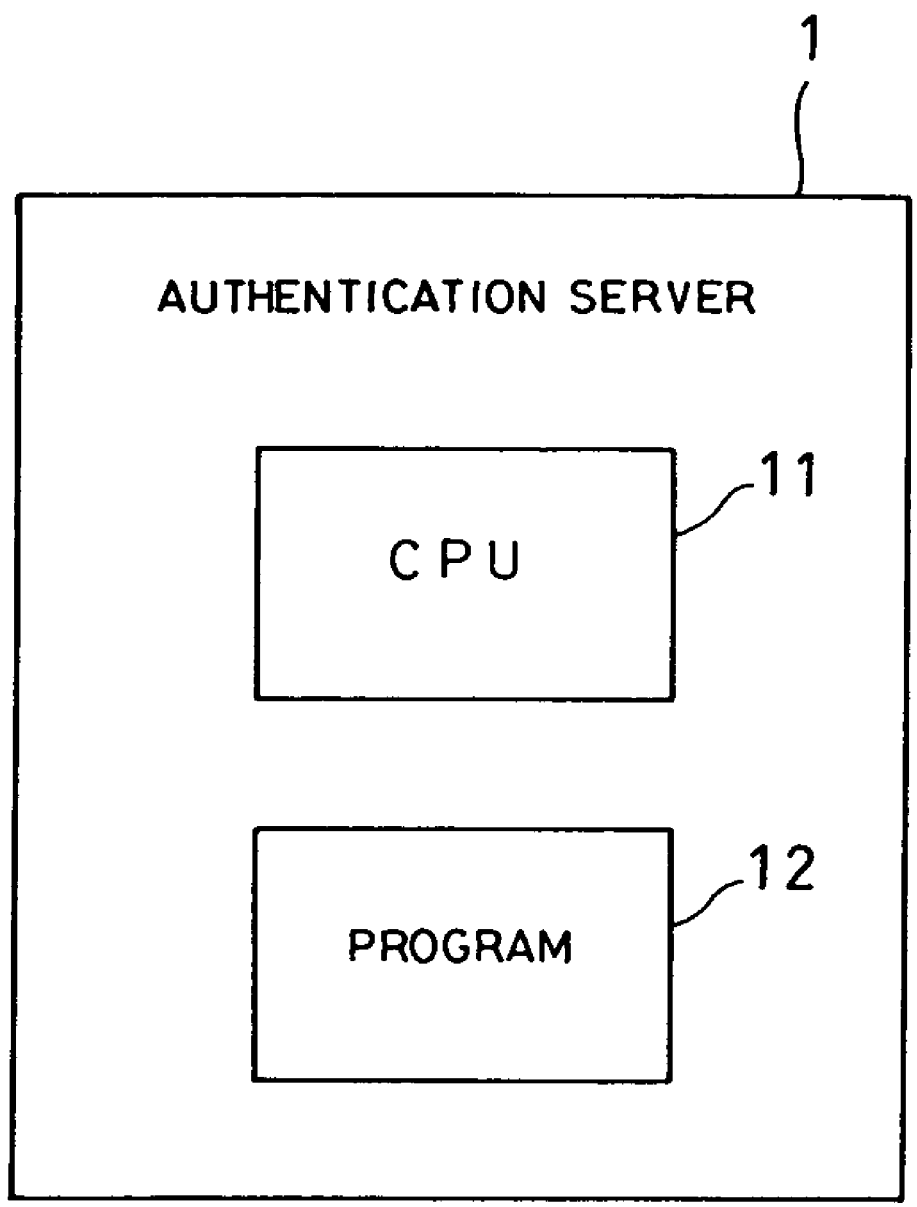
FIG. 15 is a flowchart showing the configuration of the authentication server according to a twelfth embodiment of the present invention.

FIG. 15 is a flowchart showing the process operation of an authentication server according to a twelfth embodiment of the present invention. The configuration of the authentication server and the program for controlling the operation of the authentication server according to the twelfth embodiment of the present invention will be described with reference to FIG. 15. Referring to FIG. 15, the authentication server 1 comprises a CPU (Central Processing Unit) 11 and a program 12. The CPU 11 controls the authentication server 1 in accordance with the program 12. The latter is configured as shown in the flowchart in FIGS. 2, 3, 5, and 7 to 14. That is, the program 12 controls the authentication server 1 to execute the above described process.

As described above, the present invention provides a personal authentication system for connecting, via a communication line, an authentication server for authenticating a client to identify the client to an authentication terminal for inputting authentication information required for said personal authentication and previously registered, wherein the system has a database arranged therein, for storing at least personal authentication data required for said personal authentication, settling account information required to process charges, and data required to receive various services, and the authentication server collates the authentication information input from the authentication terminal via the communication terminal, against the personal authentication data stored in said database to identify client, processes charges based on the settling account information registered in the database based on a request from the authentication terminal when the client is authenticated during the identification, and provides, registers, and manages personal data registered beforehand in the database based on a request from the authentication terminal when the client is authenticated during the identification and periodically communicating a collation history, a personal data usage history, and a charge process history. This avoids the situation where the client cannot receive the service because he fails to carry his card or the like with his or loses it, thereby preventing the abuse of the card or the like by a third person and the leakage of the personal information.

What is claimed is:

1. A personal authentication system for connecting, via a communication line, an authentication server for authenticating a client to identify the client to an authentication terminal for inputting authentication information required for said personal authentication:

wherein the system has a database for storing at least personal authentication data required for said personal authentication and previously registered, settling account information required to process charges, and data required to receive various services;

wherein said authentication server has a function of collating said authentication information input from said authentication terminal via said communication terminal, against said personal authentication data stored in said database, a function of processing charges based on said settling account information registered in said database based on a request from said authentication terminal when the client is authenticated during said identification, and a function of providing, registering, and managing personal data registered beforehand in said database based on a request from said authentication terminal when the client is authenticated during said identification and periodically communicating a collation history, a personal data usage history, and a charge process history;

wherein the function of communicating said collation history, said personal data usage history, and said charge process history is configured to communicate this information by electronic mail at preset specified times; and wherein only at times other than said preset specified times, said collation history, said personal data usage history, and said charge process history are recorded.

2. A personal authentication system for connecting, via a communication line, an authentication server for authenticating a client to identify the client to an authentication terminal for inputting authentication information required for said personal authentication:

wherein the system has a database for storing at least personal authentication data required for said personal authentication and previously registered, settling account information required to process charges, and data required to receive various services;

wherein said authentication server has a function of collating said authentication information input from said authentication terminal via said communication terminal, against said personal authentication data stored in said database, a function of processing charges based on said settling account information registered in said database based on a request from said authentication terminal when the client is authenticated during said identification, and a function of providing, registering, and managing personal data registered beforehand in said database based on a request from said authentication terminal when the client is authenticated during said identification and periodically communicating a collation history, a personal data usage history, and a charge process history;
wherein the function of communicating said collation history, said personal data usage history, and said charge process history is configured to show this information on a home page;
wherein only previously registered clients are allowed to view said home page; and
wherein said authentication server renews said collation history, said personal data usage history, and said charge process history, that is shown on said home page, after reading out said personal data registered beforehand and communicating read out personal data; and
wherein said authentication server renews said collation history, said personal data usage history, and said charge process history, that is shown on said home page, after reading out and modifying said personal data registered beforehand.

3. A personal authentication system for connecting, via a communication line, an authentication server for authenticating a client to identify the client to an authentication terminal for inputting authentication information required for said personal authentication:
wherein the system has a database for storing at least personal authentication data required for said personal authentication and previously registered, settling account information required to process charges, and data required to receive various services;
wherein said authentication server has a function of collating said authentication information input from said authentication terminal via said communication terminal, against said personal authentication data stored in said database, a function of processing charges based on said settling account information registered in said database based on a request from said authentication terminal when the client is authenticated during said identification, and a function of providing, registering, and managing personal data registered beforehand in said database based on a request from said authentication terminal when the client is authenticated during said identification and periodically communicating a collation history, a personal data usage history, and a charge process history;
wherein said authentication terminal is installed at a hospital clerk's window and is configured to request said authentication server to execute said identification when the client visits said hospital and is configured to request said authentication server to extract personal information including a medical sheet and various examination data of the client who is authenticated during said identification and is configured to pay said hospital medical expenses from said settling account;
wherein when said authentication server does not detect a match between said authentication information input from said authentication terminal and said personal authentication data, said authentication server notifies said authentication terminal that the client is not authenticated; and
wherein when the client requires additional diagnosis or treatment, said authentication terminal is configured to request said authentication server to extract the client's medical sheet, and is configured to schedule an appointment for said additional diagnosis or treatment.

4. A personal authentication method for a personal authentication system for connecting, via a communication line, an authentication server for authenticating a client to identify the client to an authentication terminal for inputting authentication information required for said personal authentication:
storing at least personal authentication data required for said personal authentication and previously registered, settling account information required to process charges, and data required to receive various services in a database stored on a computer; and
collating said authentication information input from said authentication terminal via said communication terminal, against said personal authentication data stored in said database, a step of processing charges based on said settling account information registered in said database based on a request from said authentication terminal when the client is authenticated during said identification, and a step of providing, registering, and managing personal data registered beforehand in said database based on a request from said authentication terminal when the client is authenticated during said identification and periodically communicating a collation history, a personal data usage history, and a charge process history at said authentication server;
wherein the step of communicating said collation history, said personal data usage history, and said charge process history is configured to communicate this information by electronic mail at preset specified times; and
wherein only at times other than said preset specified times, said collation history, said personal data usage history, and said charge process history is recorded.

5. A personal authentication method for a personal authentication system for connecting, via a communication line, an authentication server for authenticating a client to identify the client to an authentication terminal for inputting authentication information required for said personal authentication:
storing at least personal authentication data required for said personal authentication and previously registered, settling account information required to process charges, and data required to receive various services in a database stored on a computer; and
collating said authentication information input from said authentication terminal via said communication terminal, against said personal authentication data stored in said database, a step of processing charges based on said settling account information registered in said database based on a request from said authentication terminal when the client is authenticated during said identification, and a step of providing, registering, and managing personal data registered beforehand in said database based on a request from said authentication terminal when the client is authenticated during said identification and periodically communicating a collation history, a personal data usage history, and a charge process history at said authentication server;
wherein the step of communicating said collation history, said personal data usage history, and said charge process history is configured to show this information on a home page;
wherein only previously registered clients are allowed to view said home page; and
renewing said collation history, said personal data usage history, and said charge process history, that is shown on said home page, after reading out said personal data registered beforehand and communicating read out personal data at said authentication server; and
renewing said collation history, said personal data usage history, and said charge process history, that is shown on said home page, after reading out and modifying said personal data registered beforehand at said authentication server.

6. A personal authentication program for a personal authentication system for connecting, via a communication line, an authentication server for authenticating a client to identify the client to an authentication terminal for inputting authentication information required for said personal authentication:
   instructions stored in a computer for storing at least personal authentication data required for said personal authentication and previously registered, settling account information required to process charges, and data required to receive various services in a database; and
   instructions stored in a computer for collating said authentication information input from said authentication terminal via said communication terminal, against said personal authentication data stored in said database, a step of processing charges based on said settling account information registered in said database based on a request from said authentication terminal when the client is authenticated during said identification, and a step of providing, registering, and managing personal data registered beforehand in said database based on a request from said authentication terminal when the client is authenticated during said identification and periodically communicating a collation history, a personal data usage history, and a charge process history at said authentication server;
   wherein the step of communicating said collation history, said personal data usage history, and said charge process history is configured to communicate this information by electronic mail at preset specified times; and
   wherein only at times other than said preset specified times, said collation history, said personal data usage history, and said charge process history is recorded.

7. A personal authentication program for a personal authentication system for connecting, via a communication line, an authentication server for authenticating a client to identify the client to an authentication terminal for inputting authentication information required for said personal authentication:
   instructions stored in a computer for storing at least personal authentication data required for said personal authentication and previously registered, settling account information required to process charges, and data required to receive various services in a database; and
   instructions stored in a computer for collating said authentication information input from said authentication terminal via said communication terminal, against said personal authentication data stored in said database, a step of processing charges based on said settling account information registered in said database based on a request from said authentication terminal when the client is authenticated during said identification, and a step of providing, registering, and managing personal data registered beforehand in said database based on a request from said authentication terminal when the client is authenticated during said identification and periodically communicating a collation history, a personal data usage history, and a charge process history;
   wherein the step of communicating said collation history, said personal data usage history at said authentication server, and said charge process history is configured to show this information on a home page;
   wherein only previously registered clients are allowed to view said home page; and
   instructions stored in a computer for renewing said collation history, said personal data usage history, and said charge process history, that is shown on said home page, after reading out said personal data registered beforehand and communicating read out personal data at said authentication server; and
   instructions stored in a computer for renewing said collation history, said personal data usage history, and said charge process history, that is shown on said home page, after reading out and modifying said personal data registered beforehand at said authentication server.

* * * * *